H. M. SMITH.
COMBINATION WELDING MACHINE.
APPLICATION FILED SEPT. 30, 1918.
1,351,446.
Patented Aug. 31, 1920.
5 SHEETS—SHEET 2.
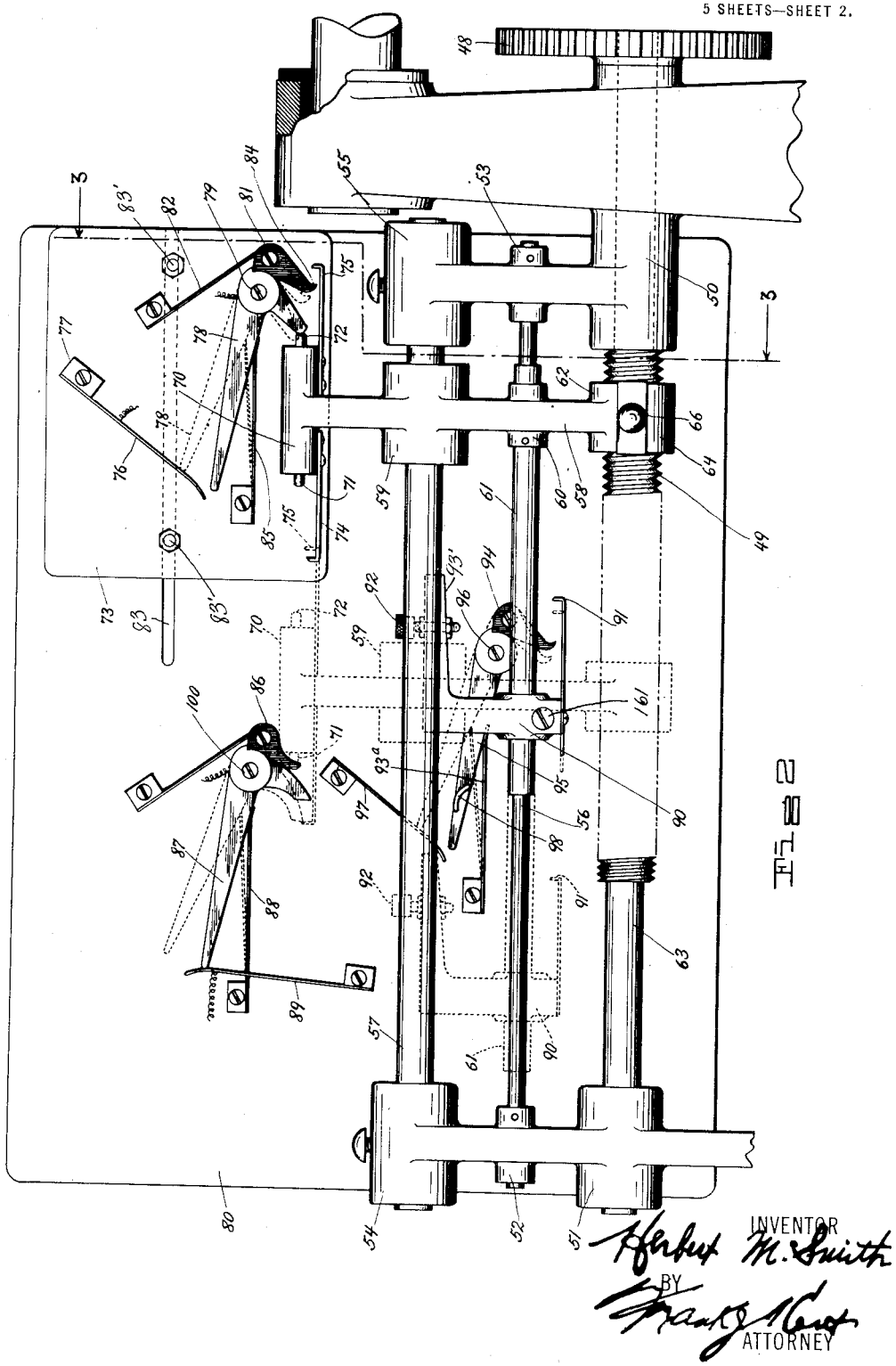

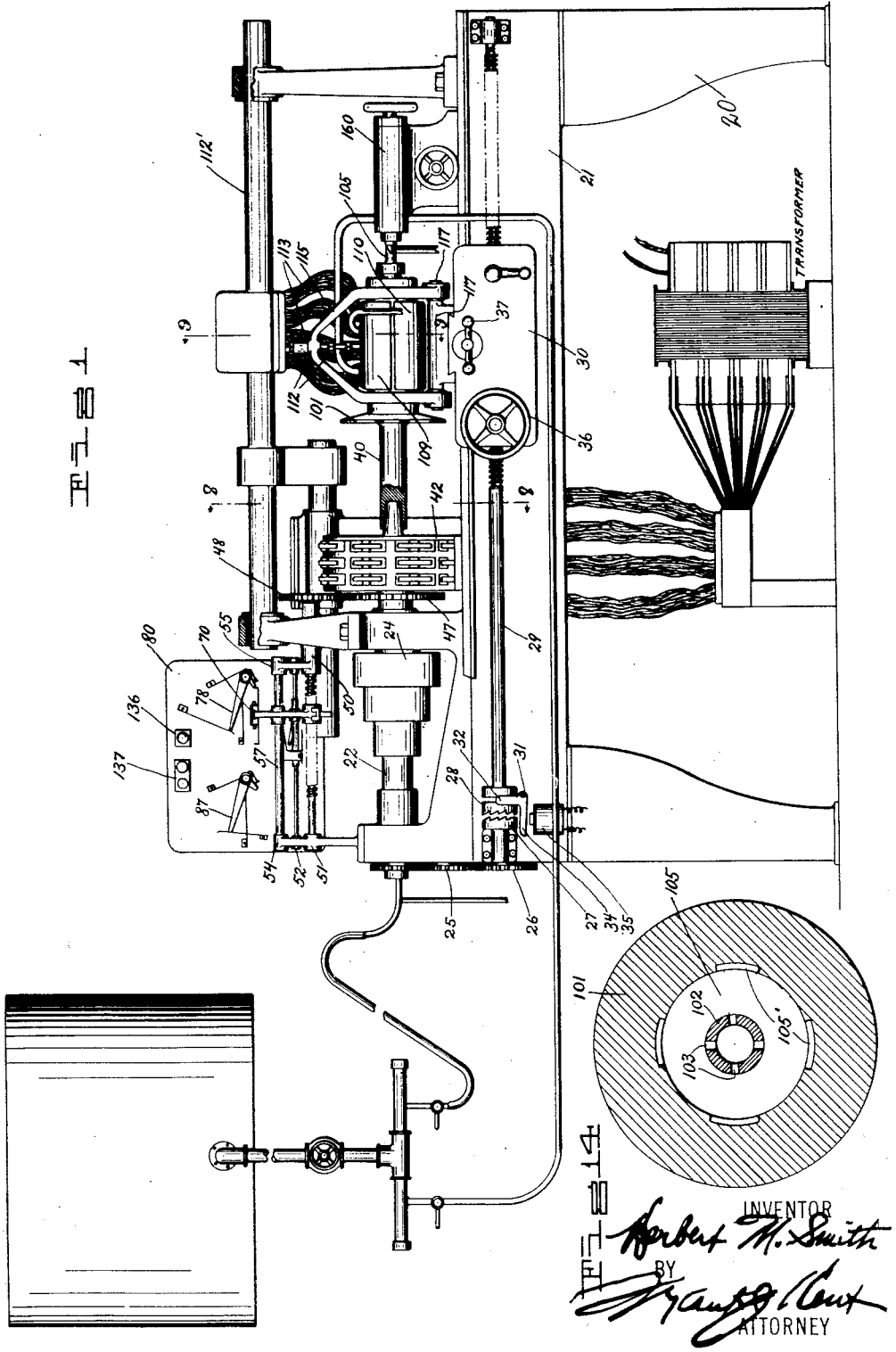

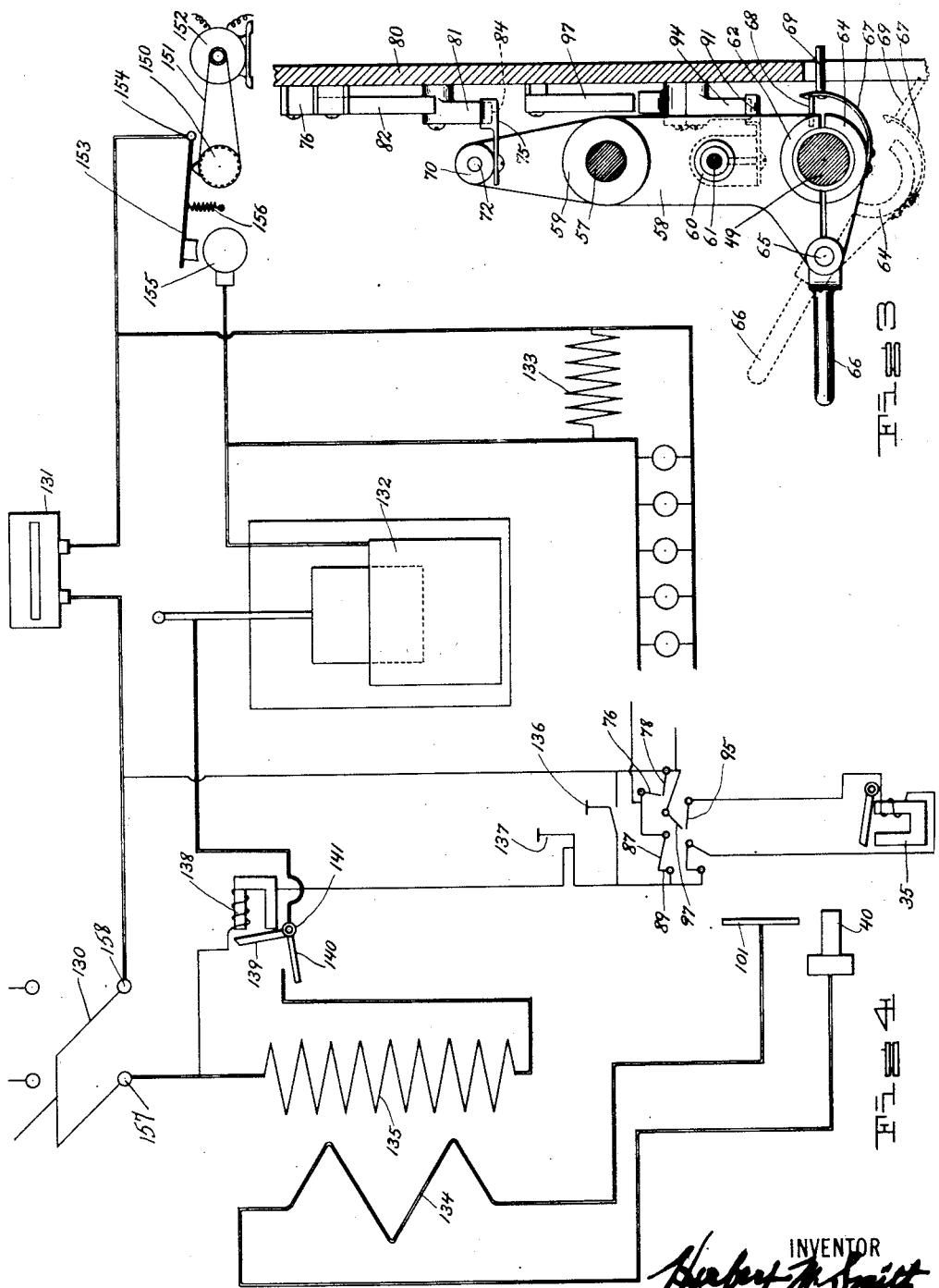

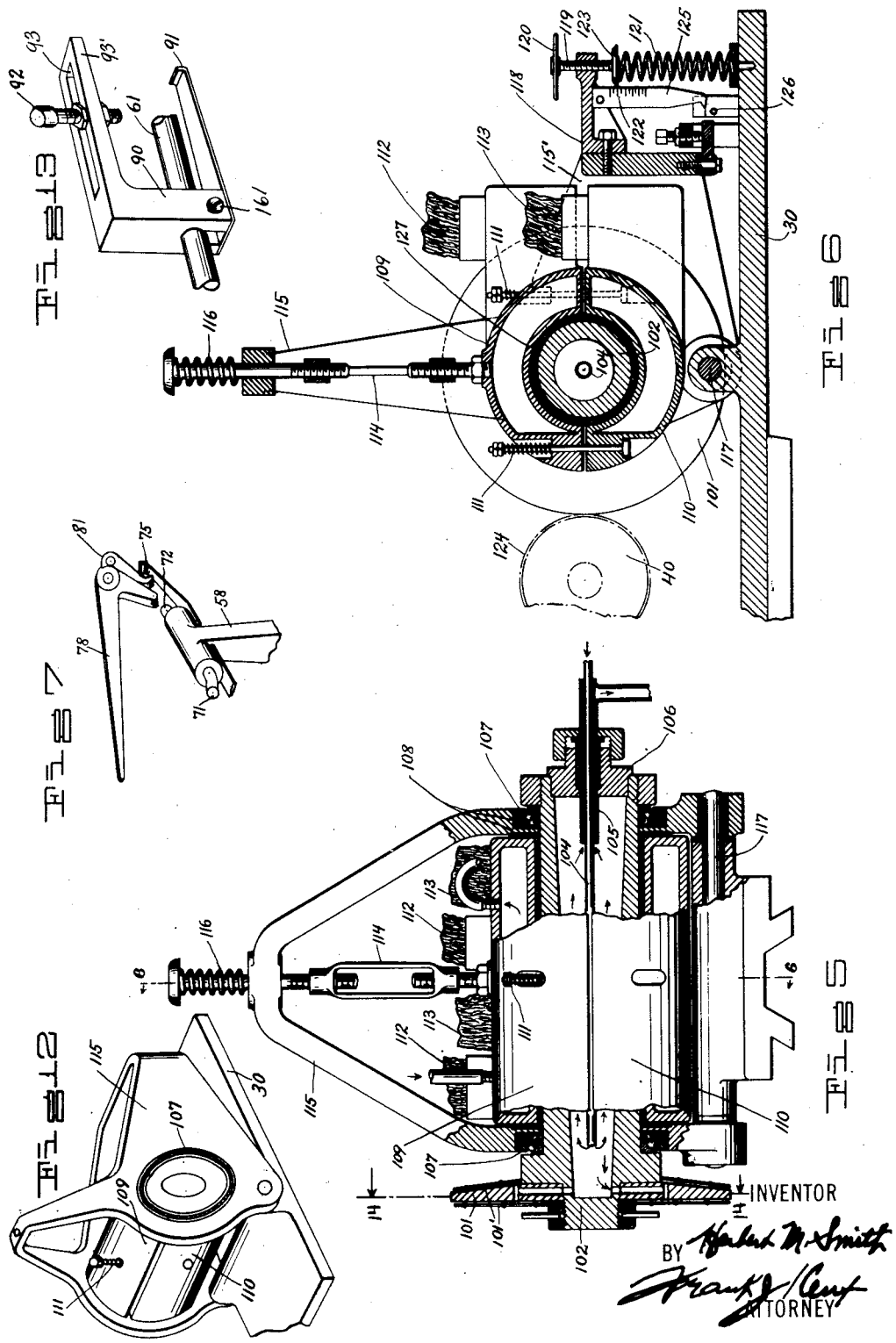

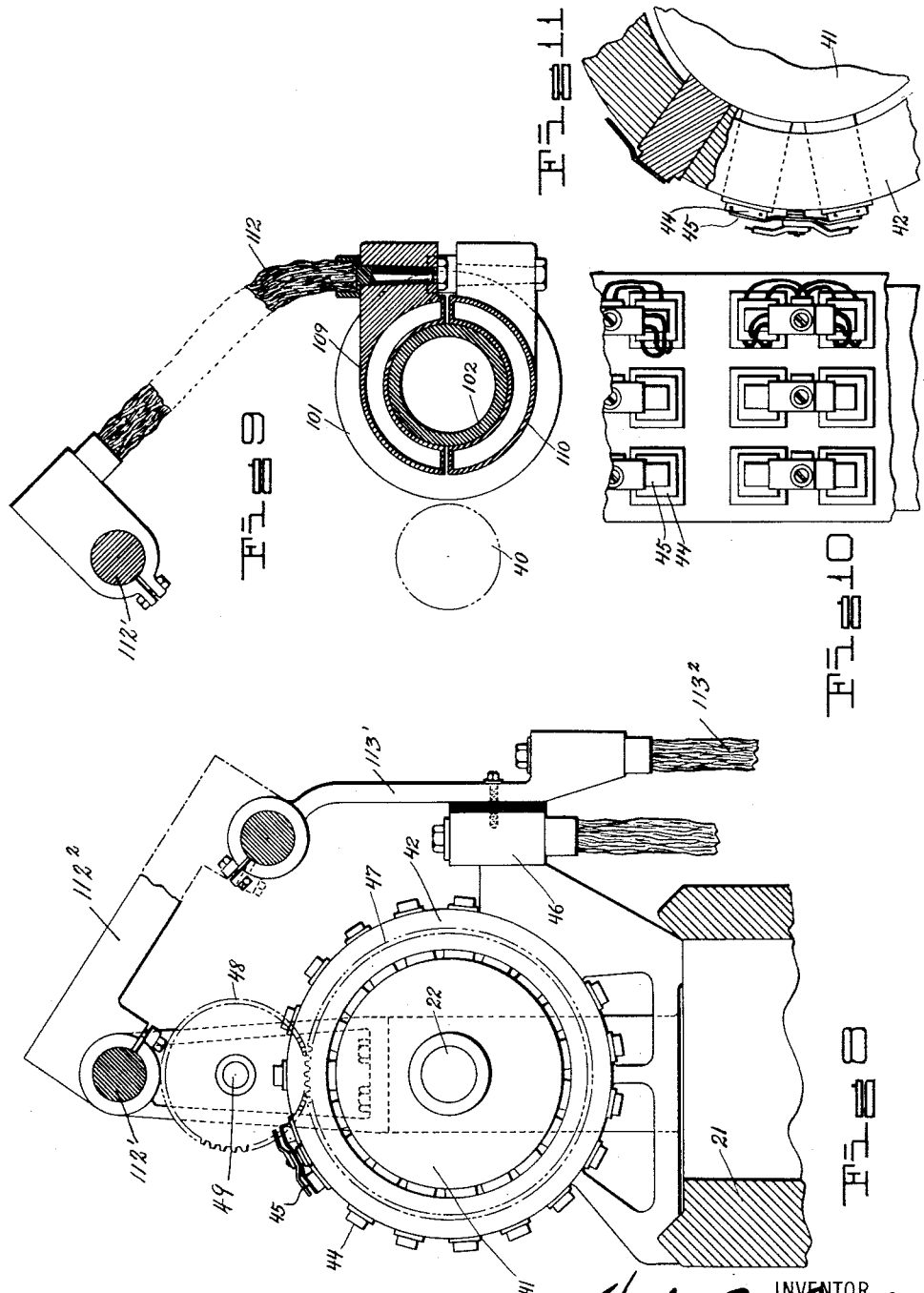

UNITED STATES PATENT OFFICE.

HERBERT M. SMITH, OF GREAT BARRINGTON, MASSACHUSETTS, ASSIGNOR TO STANLEY INSULATING COMPANY, OF GREAT BARRINGTON, MASSACHUSETTS, A CORPORATION OF MAINE.

COMBINATION WELDING-MACHINE.

1,351,446.  Specification of Letters Patent.  Patented Aug. 31, 1920.

Application filed September 30, 1918. Serial No. 256,292.

*To all whom it may concern:*

Be it known that I, HERBERT MILLS SMITH, a citizen of the United States, residing at Great Barrington, in the county of Berkshire and State of Massachusetts, have invented certain new and useful Improvements in Combination Welding-Machines, of which the following is a specification.

This invention relates to electric welding apparatus and has for one of its objects to provide a welding machine which may be adapted for doing circular, or helical, or spot welding, or combinations of these.

A further object is to provide a machine of this character in which the work is held on a rotating arbor, the arbor constituting one electrode, and a coöperating roller or wheel electrode mounted to engage the work on the arbor, with power means optionally operable to advance the wheel electrode longitudinally of the arbor, together with automatically operative means to stop the travel of the wheel electrode longitudinally of the arbor at a predetermined point and break the welding circuit.

Another object is to provide in an apparatus of the kind described, automatically operable means for initially accomplishing a circular weld and thereupon, after a variably predetermined interval of time, or at a variably predetermined stage of the circular welding operation, proceeding with a helical welding operation; and incidentally to provide means for variably predetermining the length of time during which welding current is flowing.

A further object is to provide an improved mounting for the traveling wheel electrode, including an arrangement for minimizing friction, a cooling system, with means for flowing water over the work directly from the wheel electrode, and means for regulating the degree of pressure between the roller and the work.

Still another object is to provide for obtaining a better weld by intermittently interrupting the welding current.

Other objects of the invention more or less broad than those referred to will be in part obvious and in part specifically referred to in the course of the following description of the elements, combinations, and arrangements of parts going to make up the invention; and the scope of protection which I contemplate will appear from the claims.

In the accompanying drawings which are to be taken as a part of this specification, and in which I have shown a merely preferred form of embodiment of the invention, Figure 1 is an assembly in elevation of a machine embodying the various features of my invention; Fig. 2 is a detail in elevation of parts of the automatic controls for the making and breaking of circuit and for the initiating or stopping of movement of the traveling electrode when the latter has proceeded from its first position to its position at the completion of a helical weld; Fig. 3 is a section on the line 3—3 of Fig. 2; Fig. 4 is a diagram illustrating the electrical and electromagnetic circuit connections; Fig. 5 is a detail partly in section and partly in elevation of the wheel electrode, illustrating the mounting thereof; Fig. 6 is a section taken on the line 6—6 of Fig. 5; Fig. 7 is a detail in perspective of a part of the welding-circuit-controlling means; Fig. 8 is an enlarged section on the line 8—8 of Fig. 1; Fig. 9 is an enlarged section on the line 9—9 of Fig. 1; Fig. 10 is a development of the collector; Fig. 11 is a fragmentary view partly in section, looking from the right at the subject-matter of Fig. 10; Fig. 12 is a view in perspective illustrating the parts supporting the wheel electrode; Fig. 13 is a detail in perspective of parts of the mechanism for controlling the helical welding operation; and Fig. 14 is a sectional view taken on the line 14—14 of Fig. 5.

Referring to the numerals on the drawings, there is shown at 20 a supporting structure including a bed 21. Suitably supported in brackets extending upwardly from the bed 21 is a main driving shaft 22 on which are secured the driving pulleys 24. From the drive shaft 22 is driven, by means of a train of gears 25, a short shaft 26 having at its end a clutch part 27 coöperating with a clutch part 28 mounted on the end of a screw shaft 29 which engages and by its rotation causes the bodily travel of a carriage 30 in a familiar manner. The shaft 29 of course will not be rotated unless the clutch parts 27 and 28 are in engagement.

The engagement of these parts is controlled by a bell crank lever pivoted at 31 to the machine frame and having one arm 32 engaging the clutch part 28 by means of a pin-and-slot connection, the other arm 34 of the bell crank constituting the armature of an electromagnet 35. When this electromagnet is energized, obviously it will result in clutching together the parts 27 and 28, so that rotation of the shaft 26 will result in rotation of the screw shaft 29, with consequent travel longitudinally of the shaft, of the carriage 30. The carriage 30 may be moved by hand along the shaft 29 by means of a hand wheel 36 in the manner familiar in lathe constructions. There is also provided in the carriage an operating handle or wheel 37 for causing movement laterally of the carriage of certain parts supported on the carriage and hereinafter described. The drive shaft 22, or an extension thereof, extends centrally through the collector shown in Figs. 8, 10 and 11, and its projection or extension beyond this collector is of copper, and over it fits a copper arbor 40 which carries the tube or other work which is to be welded. This arbor 40 constitutes the stationary electrode of the machine, having no movement except that of rotation.

The electrode, shown in Figs. 1, 8, 10 and 11 comprises a massive rotor of copper indicated at 41, surrounding which is a tubular casting 42 supported on the bed plate as shown in Fig. 8. Through the walls of this casting 42 extend a number of copper blocks 44 disposed circumferentially and also longitudinally of the casting in regular order as shown in the drawings. These blocks of copper are radially disposed with respect to the center of the electrode 41 and are constantly pressed toward that center and consequently against the rotating surface of the electrode 41 by means of flat springs 45 suitably secured between circumferentially adjacent blocks 44 and having their ends bearing against the blocks. The method of connecting the several blocks electrically for the most effective distribution of the current is shown in Figs. 10 and 11. The connection from this electrode to the transformer is indicated at 46.

The controls for the circuit and for the initiating or stopping of the travel of the traveling electrode are operated from the drive shaft 22. To this end there is secured on the drive shaft a gear 47 which meshes with a gear 48 mounted on a threaded shaft 49 suitably secured in the machine frame, the bearings for the shaft 49 being indicated at 50 and 51. These bearing members 50 and 51 have extensions providing additional bearings 52, 53, 54 and 55. In the bearings 52 and 53 is mounted a guide rod 56 and in the bearings 54 and 55 a guide rod 57. Coöperating with the threaded shaft 49 so as to travel longitudinally of the shaft when the latter is rotated, there is a casting 58 having a portion 59 slidable on the rod 57 and a collar 60 in which is held a sleeve 61 slidable on the guide rod 56. The end of the element 58 which engages the threaded rod 49 comprises an unthreaded half section 62 and a threaded complementary section 64 pivoted to the section 62 as indicated at 65, pivotal movement being accomplished by means of a handle 66, and the two sections normally held together by means of a spring latch 67 engaging the projection 68 of the section 62. A finger piece 69 is provided for disengaging the latch and when this is done the bottom or threaded section falls by gravity to the dotted line position of Fig. 3. This means that the threaded section 64 is out of engagement with the threads of the shaft 49 so that rotation of the shaft will not cause the movement of the casting 58 longitudinally of the shaft. So long as the parts are held in the full line position of Fig. 3, however, the casting 58 will travel longitudinally of the shaft as the latter rotates. In order that it may be impossible for the member 58 to travel too far toward the left, thus jamming the machine, the left-hand end of the shaft 49 is unthreaded, as indicated at 63. Assuming that the parts are in the full line position of Fig. 3 and that the member 58 is traveling to the left (Fig. 2), this movement is utilized to effect control of the welding circuit. At the upper end of the member 58 there is a piece 70 having at its ends fingers 71 and 72 and also provided with long extensions 74 and 75, with upturned ends. The numeral 76 indicates a contact spring fastened at 77 to an insulating panel 73 adjustably secured on the main insulating panel or control board 80, by means of slot 83 in panel 80, and bolts 83' passing through panels 73 and 80; by this construction the panel 73 may be adjustably fixed in position on panel 80, for purposes hereinafter referred to. 78 indicates a contact member in the form of a bell crank having a long arm and a short arm and pivoted at 79 to insulating panel 73. This contact member 78 is normally held in the full line position of Fig. 2 by means of a pivoted locking dog 81, which dog is held in locking engagement with the contact member by means of a spring 82. The locking dog 81 has a projecting end 84 which, when the parts are in the full line position of Fig. 2, is adapted to be engaged by the member 75 when the latter travels toward the left of Fig. 2. The result of this engagement is to release the locking dog 81 from its engagement with the contact member 78, permitting the contact member 78 to go to its dotted line position of Fig. 2 under the influence of spring 85. In this dotted line position the contact member 78 is in electrical engagement with the member 76 and this contact results in closing the welding circuit at this point, as will be apparent from an inspection of Fig. 4. As the member 58 proceeds toward the left to the dotted line position of Fig. 2 the projection 71 strikes the lower end of a pivoted locking dog 86 similar to the locking dog 81, and which has been holding in the full line position of Fig. 2 a contact member 87 similar in all respects to the contact member 78. This engagement between the member 71 and the locking dog 86 releases the contact member 87 from the locking dog and permits it to assume its dotted line position of Fig. 2 under the influence of spring 88. In this dotted line position contact between the member 87 and a complementary contact member 89 is broken which results in the breaking of the welding circuit. This action corresponds with the farthest travel of the member 59, and again corresponds with the end of the welding operation. Consequently, the welding operation can no longer proceed and the article is to be removed and another piece put in. This refers to ordinary circular welding.

Obviously the length of time during which the welding circuit remains closed may be determined by adjustment of the panel 73, as may also the length of the time interval elapsing between the moment of application of power to shaft 22 and the closing of the welding circuit; to the same ends the extension 74 and 75 may be adjustably fixed on the member 70, or members 74 and 75 of different lengths may be employed.

In cases where helical welding is to be done, or a combination of circular and helical welding, the machine is provided with another control which is operated also by the travel of the member 58. On the sleeve 61 which is fastened to the member 58, there is adjustably secured a member 90 which carries an adjustably held projection 91 and a screw 92 adjustably held in a slot 93 of arm 93' of member 90. I have shown by dotted lines in Fig. 2 different adjusted positions of member 91, or different lengths thereof. The projection 91, as the member 58 moves toward the left of Fig. 2, engages the lower end of a pivoted locking dog 94 similar to the locking dogs already described, and which normally holds in its full line position of Fig. 2 a contact member 95 similar to the contact members 78 and 87, except that it has only one arm pivoted at 96. When the contact member 95 is released from the dog 94 by the movement of the member 91, the contact member turns on its pivot 96 to the dotted line position of Fig. 2 so as to bring it in contact with the contact member 97 under influence of spring 93ª. This closes a circuit between 95 and 97, closing circuit through electromagnet 35, which results in the bringing together of the clutch parts 27 and 28, whereby rotation of shaft 26 causes rotation of threaded shaft 29, and this in turn accomplishing the travel of the carriage 30 lengthwise of the shaft. Parts 94, 95 and 97 are of course carried on the insulating panel 80, and 95 and 97 form parts of the circuit for electromagnet 35. It will be understood that the roller electrode is mounted on this carriage 30 and so long as the advance of the carriage 30 continues, the engagement of the wheel electrode with the work will be in an advanced or progressively advanced line according as the electromagnet circuit is kept closed momentarily or for a longer period of time. As the member 90 continues its travel toward the left, the end of the screw 92 carried thereby comes into engagement with a lug 98 formed on the contact member 95, whereby the contact member 95 is depressed from its dotted line position of Fig. 2 to the full line position thereof, whereupon the locking dog 94 again comes into engagement with the contact member 95 and holds it in the full line position out of engagement with the contact member 97, so that the circuit through the electromagnet 35 is broken. Just how long this circuit remains closed depends upon the location of the screw 92, that is to say, depends on how long after the contact between 95 and 97 is made, that it is broken again.

As the parts are arranged and adjusted in Fig. 2, the welding circuit will be closed after the power-shaft 22 begins to turn, and the advance of carriage 30 will begin after circular welding has proceeded for a time. By making adjustments above referred to it is possible to have the beginning of advance of the carriage coincide with the closing of the welding circuit, or to have circular welding proceed for any particular length of time before advance of the carriage begins, or to have the beginning of rotation of arbor 40 and or the beginning of travel of carriage 30 simultaneously with or at any particular time prior to the closing of the welding circuit, and to have the ending of the advance of carriage 30 occur coincidentally with or at any particular time prior to the opening of the welding circuit.

For bringing the control parts back to operating position after the welding operation is completed the member 58 is unlocked from its threaded engagement with the shaft 49, as shown in dotted lines in Fig. 3, and the part 58 is moved by hand to the full line position of Fig. 2 whereupon the parts of the member 58 are again brought to the full line position of Fig. 3, ready for another operation. In making this return movement of the member 58 toward the right of Fig. 2, the projection 74 of the member 70 engages the end of the short arm of the bell crank contact member 87 (see dotted lines of Fig. 2), and locks the contact member on its pivot 100 to again close circuit between members 87 and 89; and the projection 72 of the member 70 strikes in a similar way the lower end of the short arm of the member 78 rocking the member 78 from the dotted line position of Fig. 2 to the full line position thereof which results in opening the circuit between 78 and 76. At the same time the projection 91 of member 90 passes yieldingly beneath the end of dog 94, because of its resiliency and the beveling of the end of the dog, to the full line position of Fig. 2. Thus, in the relation of parts shown in Fig. 2, as the machine first begins to operate the welding current is not on, and does not come on until the member 58 has traveled a short distance toward the left of Fig. 2, i. e., the distance between point 84 and the up-turned end 75, in full lines in Fig. 2.

Supported on the carriage 30 is the wheel electrode, which is adjustable laterally of the carriage through the hand wheel 37 as before stated, and which travels longitudinally of the machine along with the carriage. This wheel electrode comprises a welding wheel proper 101 held on the end of a copper rotor 102, this rotor 102 being cored out and provided with means for circulating cooling liquid through it, comprising an inlet pipe 104 and radial outlets 103. The wheel itself is provided with a central aperture which fits over the end of the rotor, and from this central opening extends inwardly a deep circular groove 105, which when the parts are properly positioned, as indicated in Fig. 5, is in line with the radial outlets 103 of the rotor. 105' indicates holes drilled through the wheel at the inner end of groove 105 and communicating therewith so that water from the interior of the rotor finds its way through outlets 103, groove 105, and holes 105' to the outer surfaces of the wheel and to the working edge-face thereof. If desired, shields 101' may be provided on opposite surfaces of the wheel, spaced away from the surfaces by washers and held in place by screws, as shown. I contemplate using also means whereby the flow of water into the rotor will take place only while welding current is flowing through the wheel. Thus the inlet 104 may be provided with a valve automatically opened and closed as the welding current is on or off. An end closure for the hollow rotor is indicated at 106. This rotor is mounted in ball bearings 107, and 108 indicates insulation. Surrounding this rotor there are two half shells 109 and 110 each cored out for the circulation of water for cooling, and connected together by means of spring bolts 111. These half sections 109 and 110 are of copper and their electrical connection with the transformer is by way of conductors 112 and 113, through bus-bar 112', copper connection 112², bar 113', and connection 113². Connected to the upper half section 109 is a suspension member 114, including a turn buckle for adjustment, and this suspension member connects to a yoke 115, with a compression spring 116 for holding the sectional members 109 and 110 up resiliently within the yoke, thereby minimizing to any desired extent the friction of these half shells on the rotor 102. The yoke 115 is fulcrumed on a pivot bolt 117, having bearings on the carriage 30, so that the whole structure can tilt slightly. This tilting is accomplished by the means shown in Fig. 6, 118 indicating an arm projecting from the U-shaped rear extension 115' of the yoke, and in which is threaded a screw 119 operated by a wheel 120, the end of the screw bearing against a compression spring 121 whose other end is seated in the carriage 30. Suitable calibrations 122 may be provided adjacent a pointer 123 at the end of the screw for reading the compression of the spring, from which in an obvious manner may be determined the pressure exercised by the welding wheel 101 against the work 124 on the arbor 40. As a means for determining that the centers of the welding wheel and of the arbor are in horizontal alinement, before applying any pressure, the end of the member 125 which carries the calibrations 122 may be formed as a pointer and a mark 126 placed at a convenient point corresponding with the conditions obtaining when the centers of the welding wheel and arbor are in horizontal alinement. The transformer connections 112 and 113 to the half-sections 109 and 110 are conveniently made within the U-shaped rear extension 115' of the yoke. In order to insure good contact between the sections 109—110 and the rotor I preferably interpose a lining or coating 127 of suitable material, of good conductive quality, with the minimum of friction and capacity to adapt itself to unevenness of surface.

The electrical connections are shown in diagram in Fig. 4 and have been in part identified. The line switch is indicated at 130, an ammeter at 131, an adjustable water-barrel resistance at 132, the rotating arbor at 40, the welding wheel at 101, the transformer secondary at 134, the transformer primary at 135. 136 indicates a manually operated switch for short-circuiting all of the automatically operated contact makers heretofore described, and is to be used when it is desired to do spot welding and of course when the machine is not operating under power. 137 indicates an emergency switch for breaking the circuit entirely without manipulating the line switch 130. 138 indicates an electromagnetic switch. When the armature 139 of this switch is attracted an arm 140 connected to the armature and pivoted at 141 closes the circuit through the transformer primary. On account of the presence of this electromagnetic circuit closer 138 it results that the transformer circuit is not closed and the welding current does not flow until after the machine has operated to a point where the contacts 76 and 78 and 87 and 89 are closed, or the switch 136 has been operated.

I have found that a better weld is accomplished if the welding current is intermittently interrupted. This results in a rapid succession of strong surges of current and possibly because of the resulting electromagnetic action has the effect of hammering the joint so that the work is simultaneously fused and forged. I have shown at the upper right hand end of Fig. 4 a circuit interrupter comprising a cam 150 rotated by means of a belt 151 from a motor 152 and intermittently raising a contact member 153 pivoted at 154 and coöperating with a contact 155, the contact member 153 after it has been raised by the cam 150, being pulled down again into contact with 155 by means of spring 156. The motor is in a circuit with the terminals 157 and 158, so that the interrupter comes into action when the welding current is on.

It will be apparent that the machine may be employed for circular welding alone, by disconnecting the member 90 from the sleeve 61 so that member 90 will not function to close the circuit of the electro-magnet 35. Thus there will be no advance of the wheel electrode longitudinally of the arbor. This cutting out of the member 90 is provided for by the screw 161 which holds the member 90 on the sleeve 61. When this screw is turned back the member 90 may be slid off of the sleeve 61 and over onto the guide rod 56 and allowed to hang down on this guide rod.

I claim:

1. A machine of the kind described, comprising a rotating arbor constituting one electrode and a coöperating wheel electrode mounted to engage the work on the arbor, hand and power-operated means, optionally operable, to cause a relative advance of the wheel electrode longitudinally of the arbor to a variably predetermined point and for making and breaking the welding circuit at variably predetermined moments.

2. An apparatus of the kind described, comprising automatically operable means for initially accomplishing a circular weld, and thereupon, at a variably predetermined stage of the circular welding operation proceeding with a helical welding operation upon the same piece of work.

3. An apparatus of the kind described, comprising automatically operable means for initially accomplishing a circular weld, and thereupon, at a variably predetermined stage of the circular welding operation proceeding with a helical welding operation upon the same piece of work, and means for variably predetermining the length of time during which welding current is flowing.

4. A wheel electrode provided with passages interiorly thereof and leading to the exterior, and means for supplying water to the interior of the wheel for distribution to the exterior.

5. A wheel electrode provided with passages interiorly thereof and leading to the exterior, means for supplying water to the interior of the wheel for distribution to the exterior, and an over-flow device.

6. A mounting for a wheel electrode including a rotor and an electrode proper carried on one end of the rotor, current conducting half sections surrounding the rotor, means for maintaining the current-conducting sections in desired pressure relation to the rotor, and means for regulating the pressure of the electrode proper against the coöperating electrode.

7. In a device of the kind described, a stationary rotating arbor constituting one electrode, a wheel electrode rotatable upon contact with the rotating arbor, means for causing rotation of the arbor for a predetermined time, and means for causing advance of the wheel electrode relatively of the arbor after a predetermined time.

8. In a device of the kind described, a stationary rotating arbor constituting one electrode, a wheel electrode rotatable upon contact with the rotating arbor, means for causing rotation of the arbor for a predetermined time, means for causing advance of the wheel electrode relatively of the arbor after and for a predetermined time.

9. In a device of the kind described, a stationary rotating arbor constituting one electrode, a wheel electrode rotatable upon contact with the rotating arbor, means for causing rotation of the arbor for a predetermined time, and means for causing advance of the wheel electrode relatively of the arbor after a predetermined time, said means including an electromagnetic clutch controlled by the rotation of the arbor.

10. In a device of the kind described, a stationary rotating arbor constituting one electrode, a wheel electrode rotatable upon contact with the rotating arbor, means for causing rotation of the arbor for a predetermined time, and means for causing advance of the wheel electrode relatively of the arbor after and for a predetermined time, said means including an electromagnetic clutch controlled by the rotation of the arbor.

11. In a device of the kind described, a stationary rotating arbor constituting one electrode, a wheel electrode rotatable upon contact with the rotating arbor, means for causing rotation of the arbor for a predetermined time, means for causing advance of the wheel electrode relatively of the arbor after a predetermined time, and means for supplying welding current to the electrodes for a variably predetermined period of time during the rotation of the arbor.

12. In a device of the kind described, a stationary rotating arbor constituting one electrode, a wheel electrode rotatable upon contact with the rotating arbor, means for causing rotation of the arbor for a predetermined time, means for causing advance of the wheel electrode relatively of the arbor after and for a predetermined time, and means for supplying welding current to the electrodes for a variably predetermined period of time during the rotation of the arbor.

13. In a device of the kind described, a stationary rotating arbor constituting one electrode, a wheel electrode rotatable upon contact with the rotating arbor, means for causing rotation of the arbor for a predetermined time, means for causing advance of the wheel electrode relatively of the arbor after a predetermined time, and means for supplying welding current momentarily to the two electrodes independently of the movements of the electrodes.

14. In a device of the kind described, a stationary rotating arbor constituting one electrode, a wheel electrode rotatable upon contact with the rotating arbor, means for causing rotation of the arbor for a predetermined time, means for causing advance of the wheel electrode relatively of the arbor after and for a predetermined time, and means for supplying welding current momentarily to the two electrodes independently of the relative advance of the wheel electrode.

15. In a device of the kind described, an arbor for holding a piece of work, the arbor constituting one electrode, a wheel making contact with the work on the arbor and constituting the other electrode, means for causing relative rotation of the wheel about the arbor in a plane through a variably predetermined arc and means for thereafter causing advance of the wheel relatively of the arbor for a variably predetermined period of time and simultaneously rotating the arbor and automatically operative means for supplying welding current to the electrodes during a variably predetermined part of their aforesaid relative movements.

16. In a device of the kind described, an arbor for holding a piece of work, the arbor constituting one electrode, a wheel making contact with the work on the arbor and constituting the other electrode, means for causing relative rotation of the wheel about the arbor in a plane through a variably predetermined arc, means for thereafter causing advance of the wheel relatively of the arbor for a variably predetermined period of time and simultaneously rotating the arbor and automatically operative means for supplying welding current to the electrodes during a variably predetermined part of their aforesaid relative movements, and independent hand-operated means for supplying welding current to said electrodes momentarily.

17. In combination with a bodily movable electrode, a control member of the kind described, comprising a traveling member, means operated by the traveling member for adjustably determining the extent of movement of the movable electrode, a welding circuit and means carried by the traveling member for adjustably determining the opening and closing of the circuit.

18. In combination with a bodily movable electrode, a control member of the kind described, comprising a power-driven traveling member, means operated by the traveling member for adjustably determining the extent of movement of the movable electrode, a welding circuit and means carried by the traveling member for adjustably determining the opening and closing of the circuit.

19. In combination with a bodily movable electrode, a control member of the kind described comprising a power-driven traveling member, means operated by the traveling member for adjustably determining the extent of movement of the movable electrode, a welding circuit, means carried by the traveling member for adjustably determining the opening and closing of the circuit, and an independent manually operated circuit controller.

20. Two relatively movable electrodes and power-driven and hand-driven means for causing relative movement of the electrodes, optionally operable, means for supplying electric current to the electrodes and hand-operated and automatically-operative controls for the current, optionally operable.

21. A machine of the kind described, comprising a rotating arbor constituting one electrode and a coöperating electrode mounted to engage the work on the arbor, hand and power-operated means, optionally operable, to cause a relative advance of the second electrode longitudinally of the arbor to a variably predetermined point and for making and breaking the welding circuit at variably predetermined moments.

22. An apparatus of the kind described, comprising automatically operable means for initially accomplishing a circular weld, and thereupon, at a predetermined stage of the circular welding operation proceeding with a helical welding operation upon the same piece of work.

23. An apparatus of the kind described, comprising automatically operable means for initially accomplishing a circular weld, and thereupon, at a predetermined stage of the circular welding operation proceeding with a helical welding operation upon the same piece of work, and means for predetermining the length of time during which welding current is flowing.

24. A wheel electrode provided with a passage interiorly thereof and leading to the exterior, and means for supplying water to the interior of the wheel for distribution to the exterior.

25. A mounting for a wheel electrode including a rotor and an electrode proper carried on one end of the rotor, current conducting sections surrounding the rotor, means for maintaining the current-conducting sections in desired pressure relation to the rotor, and means for regulating the pressure of the electrode proper against the coöperating electrode.

26. In a device of the kind described, a stationary rotating arbor constituting one electrode, a second electrode rotatable upon contact with the rotating arbor, means for causing rotation of the arbor for a predetermined time, and means for causing advance of the wheel electrode relatively of the arbor after a predetermined time.

27. In a device of the kind described, a stationary rotating arbor constituting one electrode, a second electrode rotatable upon contact with the rotating arbor, means for causing rotation of the arbor for a predetermined time, and means for causing advance of the wheel electrode relatively of the arbor for a predetermined time.

28. In a device of the kind described, a rotating arbor constituting one electrode, a wheel electrode rotatable upon contact with the rotating arbor, means for causing rotation of the arbor for a predetermined time, means for causing advance of the wheel electrode relatively of the arbor for a predetermined time, and means for supplying welding current to the electrodes for a predetermined time.

29. In a device of the kind described, a rotating arbor constituting one electrode, a second electrode for contact with the rotating arbor, means for causing rotation of the arbor for a predetermined time, means for causing advance of the second electrode relatively of the arbor and for a predetermined time, and means for supplying welding current to the electrodes for a predetermined time.

30. In a device of the kind described, an arbor for holding a piece of work, the arbor constituting one electrode, a wheel making contact with the work on the arbor and constituting the other electrode, means for causing relative rotation of the wheel about the arbor, in a plane through a predetermined arc and means for causing advance of the wheel relatively of the arbor for a predetermined period of time and simultaneously rotating the arbor and automatically operative means for supplying welding current to the electrodes during a predetermined part of their aforesaid relative movements.

31. Apparatus of the character described, comprising a rotating electrode, a support surrounding said electrode, radially disposed blocks of copper or similar material slidingly mounted in said support and bearing at their inner ends on said electrode and springs yieldingly holding said blocks engaged with the surface of the electrode.

32. Apparatus of the character described, comprising a rotating electrode, a support surrounding said electrode, radially disposed blocks of copper or similar material slidingly mounted in said support and bearing at their inner ends on said electrode, springs yieldingly holding said blocks engaged with the surface of the electrode, an electrode opposed to said rotating electrode and a current-conducting clamp yieldingly engaged with the second electrode.

33. In combination, a wheel electrode, current-conducting sections engaged therewith, means for maintaining said current-conducting sections in desired pressure relation to the electrode, cooling means for the electrode and separate cooling means for the current-conducting sections.

34. In combination, a wheel electrode, a current-conducting clamp engaged therewith, means for maintaining said clamp in desired pressure relation to the electrode, a pivotal support for the clamp, and means for rocking the clamp on said pivotal support toward or away from the work.

35. In combination, a wheel electrode, a current-conducting clamp engaged therewith, means for maintaining said clamp in desired pressure relation to the electrode, a pivotal support for the clamp, means for rocking the clamp on said pivotal support toward or away from the work, and an indicating scale associated with said pivotally supported clamp.

36. In combination, a wheel electrode, a current-conducting clamp engaged therewith, means for maintaining said clamp in desired pressure relation to the electrode, a pivotal support for the clamp, a spring for rocking the clamp on its pivotal support and means for adjusting the tension of said spring.

37. In combination, a wheel electrode, a current-conducting clamp engaged therewith, means for maintaining said clamp in desired pressure relation to the electrode, a pivotal support for the clamp, a spring for rocking the clamp on its pivotal support, means for adjusting the tension of said spring, and means for indicating the tension to which such spring is adjusted.

38. In combination, a wheel electrode, a current-conducting clamp engaged therewith, means for maintaining said clamp in desired pressure relation to the electrode, a pivotal support for the clamp, means for rocking the clamp on said pivotal support toward and away from the work, an electrode for coöperation with the wheel electrode and a gage for indicating the relation of the two electrodes.

39. In combination, a wheel electrode, a current-conducting clamp engaged therewith, means for maintaining said clamp in desired pressure relation to the electrode, a pivotal support for the clamp, a spring for rocking the clamp on its pivotal support, and means for adjusting the tension of said spring, including a screw, an indicator actuated thereby and a scale on which said indicator registers.

40. In combination, a wheel electrode, a pivotally supported yoke provided with bearings for said electrode and a current-conducting clamp yieldingly engaged with the electrode within said yoke.

41. In combination, a wheel electrode, a pivotally supported yoke provided with bearings for said electrode, a current-conducting clamp yieldingly engaged with the electrode within said yoke, and suspension means for the clamp carried by said yoke.

42. Apparatus of the character described, comprising a traveling electrode, a carriage traveling in conformity with the travel of the electrode and switches for controlling the welding operation operable by said carriage.

43. Apparatus of the character described, comprising a traveling electrode, a carriage traveling in conformity with the travel of the electrode, switches for controlling the welding operation operable by said carriage, and means for operating said switches at different points in the travel of the carriage.

44. Apparatus of the character described, comprising a traveling electrode, a carriage traveling in conformity with the travel of the electrode, a switch for controlling the operation of the electrode, a latch for said switch and a trip on the carriage for operating said latch.

45. Apparatus of the character described, comprising a traveling electrode, a carriage traveling in conformity with the travel of the electrode, a switch for controlling the operation of the electrode, a latch for said switch and a trip on the carriage for operating said latch, said trip and latch being relatively adjustable.

46. Apparatus of the character described, comprising a traveling electrode, a carriage traveling in conformity with the travel of the electrode, a switch mounted on a base adjustable relative to the carriage and a trip on the carriage for operating said switch.

47. Apparatus of the character described, comprising a traveling electrode, a carriage traveling in conformity with the travel of the electrode, and normally open and normally closed circuit switches arranged to be actuated by said carriage in the travel thereof.

48. Apparatus of the character described, comprising a traveling electrode, a carriage traveling in conformity with the travel of the electrode, a switch latched in circuit-open position, a switch latched in circuit-closed position and means on said carriage for unlatching said switches.

49. Apparatus of the character described, comprising a traveling electrode, a carriage traveling in conformity with the travel of the electrode, a switch latched in circuit-open position, means on the carriage for unlatching said latch at the commencement of its travel, a switch latched in circuit-closed position and means on the carriage for unlatching said latter switch at the end of the travel of the carriage.

50. Apparatus of the character described, comprising a traveling electrode, a carriage traveling in conformity with the travel of the electrode, a switch latched in circuit-open position, means on the carriage for unlatching said latch at the commencement of its travel, a switch latched in circuit-closed position, means on the carriage for unlatching said latter switch at the end of the travel of the carriage, and a controlling switch operable by the carriage in the intermediate course of its travel.

51. Apparatus of the character described, comprising a traveling electrode, a carriage traveling in conformity with the travel of the electrode, and switch mechanism operable by said carriage for controlling the feed of the electrode and the circuit thereto.

52. Apparatus of the character described, comprising a traveling electrode, a carriage traveling in conformity with the travel of the electrode, switches for controlling the welding operation operable by said carriage, and means for controlling the welding operation independently of said switches.

In testimony whereof I affix my signature.

HERBERT M. SMITH.